United States Patent
Kang et al.

(10) Patent No.: US 7,381,269 B2
(45) Date of Patent: Jun. 3, 2008

(54) SYSTEM AND METHOD TO SUPPLY CHEMICAL DURING SEMICONDUCTOR DEVICE FABRICATION

(75) Inventors: Dong-kil Kang, Hwaseong-si (KR); Dae-yong Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 424 days.

(21) Appl. No.: 11/047,692

(22) Filed: Feb. 2, 2005

(65) Prior Publication Data
US 2005/0178794 A1      Aug. 18, 2005

(30) Foreign Application Priority Data
Feb. 16, 2004    (KR) .................. 10-2004-0009935

(51) Int. Cl.
*B05C 5/00*    (2006.01)
*B05C 11/02*   (2006.01)
*G01F 11/00*   (2006.01)

(52) U.S. Cl. .................. 118/300; 118/52; 222/251; 222/318

(58) Field of Classification Search .................. 118/52, 118/612, 319, 320, 683, 684; 396/604, 611; 222/251, 217, 381, 255, 318; 239/67–70
See application file for complete search history.

(56) References Cited

U.S. PATENT DOCUMENTS 6,238,109 B1 *    5/2001    Minami ...................... 396/604
2003/0180471 A1 *  9/2003   Takekuma et al. .......... 427/421

FOREIGN PATENT DOCUMENTS

| JP | 5029207 | 2/1993 |
| JP | 10172881 | 6/1998 |
| JP | 2003-195510 | 7/2003 |
| KR | 1020020069576 A | 9/2002 |
| KR | 1020030016457 A | 3/2003 |
| WO | WO03059486 | 7/2003 |

* cited by examiner

*Primary Examiner*—Yewebdar Tadesse
(74) *Attorney, Agent, or Firm*—Volentine & Whitt, PLLC

(57) ABSTRACT

Disclosed are a system and method for supplying chemical during a semiconductor device fabrication process. The system includes a tank to store the chemical, a dispensing unit to hold the chemical, a refill line connected between the tank and the dispensing unit to supply the chemical from the tank to the chemical liquid dispensing unit, and a dispensing line connected between the chemical dispensing unit and a semiconductor substrate to supply the chemical from the chemical dispensing unit to the semiconductor substrate.

10 Claims, 2 Drawing Sheets

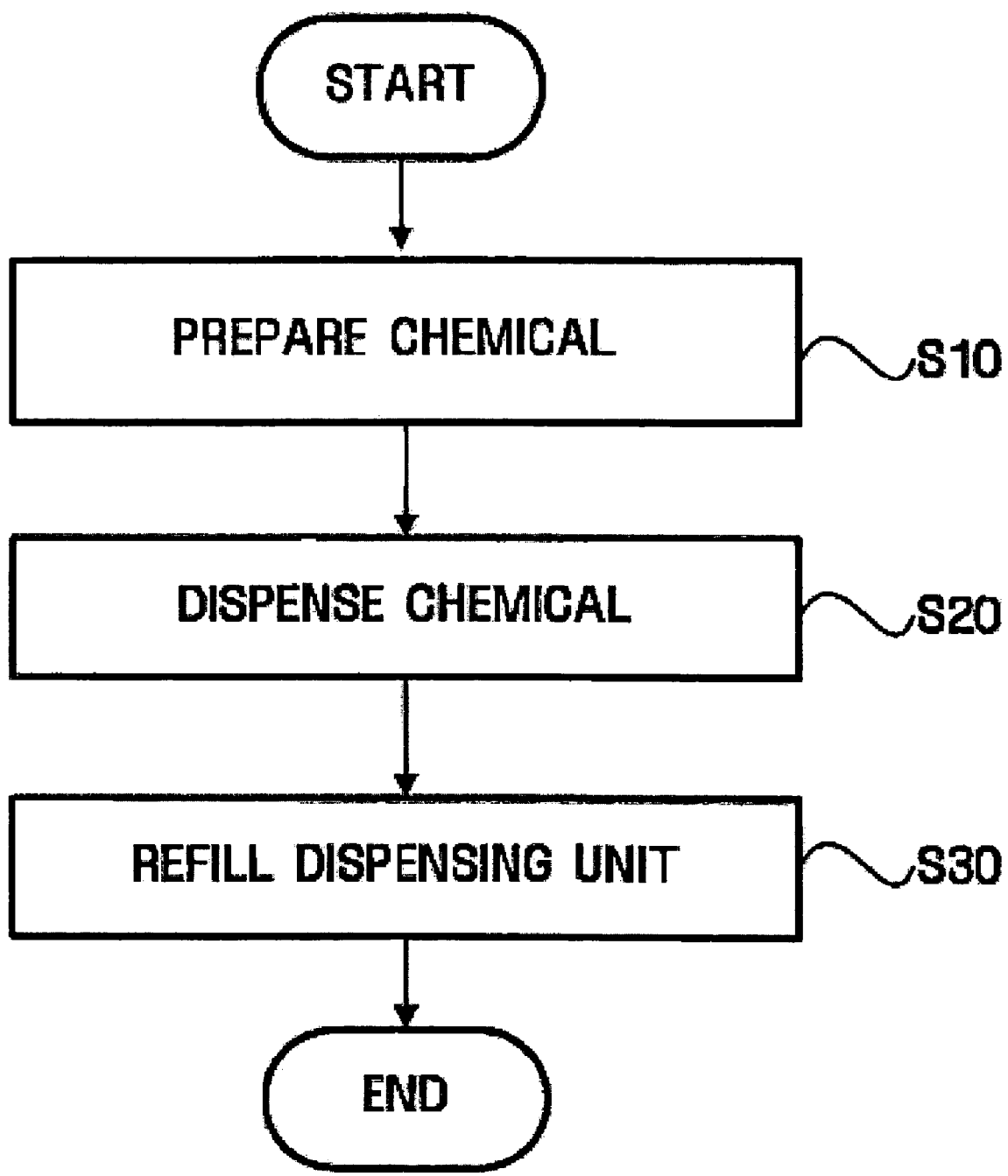

SYSTEM AND METHOD TO SUPPLY CHEMICAL DURING SEMICONDUCTOR DEVICE FABRICATION

BACKGROUND OF THE INVENTION

1. Field of the Invention

The present invention generally relates to a system and method to provide chemicals for use in a semiconductor device fabrication process. More particularly, the present invention generally relates to a system and method for efficiently providing a viscous liquid chemical onto a semiconductor substrate during a semiconductor device fabrication process.

A claim of priority is made to Korean Patent Application No. 10-2004-0009935 filed on Feb. 16, 2004, the disclosure of which is incorporated herein.

2. Description of the Related Art

Storage capabilities and operating speeds of semiconductor devices have increased to keep pace with the rapid development of information technology. In accordance with recent trends in the semiconductor field, semiconductor fabrication technology has progressed towards enhanced integration, reliability, and response speed.

Conventionally, integrated circuit patterns are formed on a semiconductor device by selectively performing process steps such as photolithography, etching, diffusion, chemical vapor deposition (CVD), ion implantation, and metallization.

Various chemicals are used during these manufacturing processes. However, there are numerous supply parameters associated with the chemicals, such as quantity or concentration, as well as the pressure and temperature of the chemicals.

The photolithography process uses a photoresist to form an etching mask to selectively etch a semiconductor substrate. Alternatively, the photoresist is used as an ion implantation mask to selectively implant ions on the semiconductor substrate. The conventional photoresist system has a filter to remove gas bubbles trapped in the photoresist. However, when a highly viscous photoresist is used, gas bubbles trapped in the photoresist cannot easily be removed. Also, it takes additional time for the highly viscous photoresist to pass through the filter. As a result, supply time increases, which in turn, increases overall processing time and total manufacturing cost.

Japanese Patent Laid-Open Publication No. 2003-195510, published on Jul. 9, 2003, discloses a chemical supply system for use in a semiconductor device fabrication process. However, the chemical supply system described in this document includes a filter for removing air bubbles. Therefore, the disclosed system has the same problems as above. Furthermore, because the chemical is directly supplied onto a semiconductor substrate from a tank, the amount of the chemical supplied varies depending on the amount of chemical stored in the tank.

SUMMARY OF THE INVENTION

The present invention provides a system that efficiently provides a chemical for use in a semiconductor device fabrication process.

The present invention also provides a method that efficiently providing a chemical onto a semiconductor substrate.

The system of the present invention includes a tank to store the chemical, a dispensing unit to hold the chemical, a refill line placing the tank in communication with the dispensing unit, and a despensing line in communication with the dispensing unit, and through which the chemical is supplied from the dispensing unit to a semiconductor substrate.

The present invention also provides a system having a tank to store the chemical, a dispensing unit to hold the chemical, a refill line placing the tank in communication with the dispensing unit, such that the dispensing unit can be refilled with the chemical stored in the tank, a dispensing line in communication with the dispensing unit, and through which the chemical is supplied from the dispensing unit to a semiconductor substrate, and a common line, which constitutes a portion of both the refill line and dispensing line, so that the chemical from the tank that refills the dispensing unit, and the chemical dispensed from the dispensing unit flow through the common line.

The present invention also provides a method of supplying chemicals onto a semiconductor substrate by storing chemical in a tank, filling a dispensing unit with the chemical from the tank through a refill line, dispensing the chemical onto the semiconductor substrate through a dispensing line, and refilling the dispensing line with the chemical from the tank.

BRIEF DESCRIPTION OF THE DRAWINGS

The above aspects of the present invention will become more apparent by the detailed description herein with reference to the attached drawings in which:

FIG. 2 is a flowchart illustrating a method to provide a liquid chemical during a semiconductor device fabrication according to an embodiment of the present invention.

DETAILED DESCRIPTION OF THE INVENTION

Figure 1:
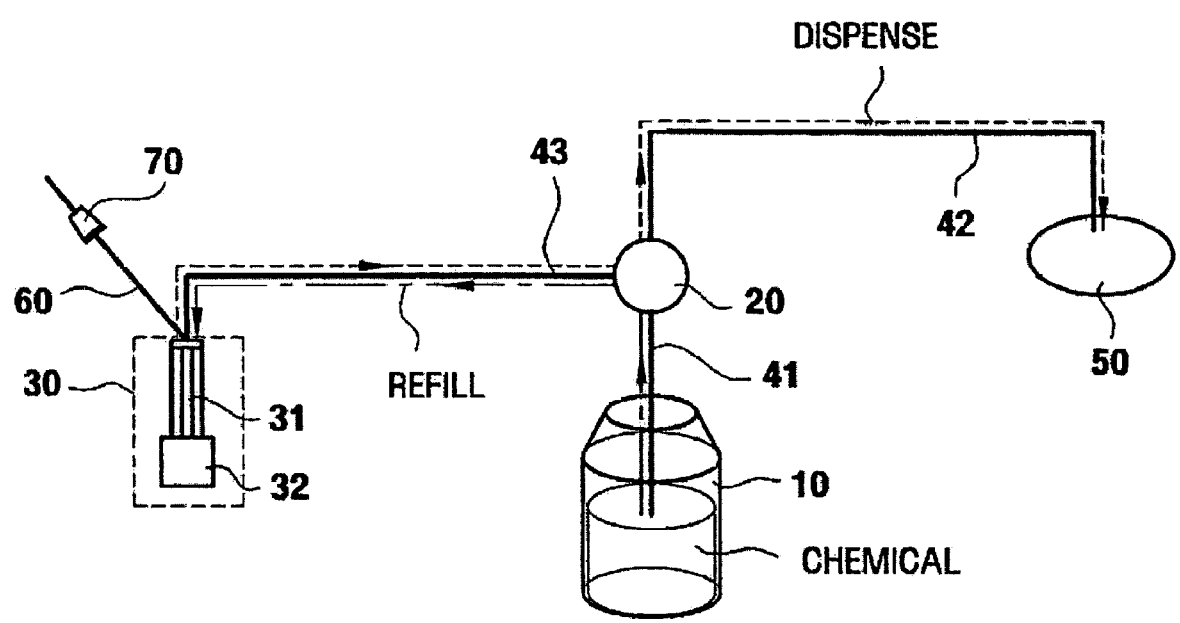
FIG. 1 is a schematic diagram illustrating a system to provide a liquid chemical used during semiconductor device fabrication according to an embodiment of the present invention.

The present invention will now be described more fully with reference to the accompanying drawings, in which select embodiments of the invention are shown. The present invention may, however, be embodied in many different forms and should not be construed as being limited to the embodiments set forth herein. Rather, these embodiments are teaching examples. Like numbers refer to like elements throughout this description and the drawings.

Referring to FIG. 1, a system to provide chemicals used during a semiconductor device fabrication process according to an embodiment of the present invention will be described in detail.

The system includes a tank 10 to store chemicals; a dispensing unit 30 to dispense the chemicals; a first line 41 used as a refill line; a second line 42 used as a dispensing line; and a third line 43 used as a common line, i.e., a refill line and a dispensing line.

A chemical is stored airtight in tank 10. Dispensing unit 30 temporarily holds the chemical prior to it being used in the semiconductor device fabrication process. One end of first line 41 is connected to tank 10, and the other end is connected to a flow adjusting unit 20. Third line 43 is also connected to flow adjusting unit 20 at one end, and connected to dispensing unit 30 on the other end. Second line 42 is connected to flow adjusting unit 20, and adapted to supply the chemical from dispensing unit 30 to a semiconductor substrate 50.

Dispensing unit 30 includes a chamber in the form of a cylinder 31, a port (not numbered in the figure) in the cylinder 31 which serves as both an inlet and an outlet of the dispensing unit 30, and a pump 32 including a reciprocating piston disposed in the cylinder 31. Pump 32 sucks a predetermined amount of the chemical stored in tank 10 through first and third lines 41, 43 and into the cylinder 31 into of the chemical dispensing unit 30 via the port. Thereafter, pump 32 pumps the chemical held in the cylinder 31 of the chemical dispensing unit 30 out of the cylinder 31 via the port, through third and second lines 43, 42, and onto semiconductor substrate 50.

The system of the present invention includes dispensing unit 30, which temporarily holds the chemical. Therefore, a consistent amount of the chemical can be supplied onto semiconductor substrate 50 regardless of the total amount of chemical stored in tank 10. When the maxim amount of the chemical stored in dispensing unit 30 is smaller than the maxim amount of the chemical stored in tank 10, the chemical can be more efficiently supplied during the semiconductor device fabrication process.

First and third lines 41, 43 are refill lines, and second and third lines 42, 43 are dispensing lines. In other words, the refill lines and the dispensing lines have a commonly shared portion, i.e., third line 43, thereby minimizing the number of chemical lines. In addition, dispensing the chemical through first, second, and third lines 41, 42, 43 reduces the generation of gas bubbles within the chemical.

In detail, when the chemical is supplied from tank 10 to dispensing unit 30, third line 43 is used as a refill line. On the other hand, when the chemical is supplied from dispensing unit 30 to semiconductor substrate 50, third line 43 is used as a dispensing line.

Preferably, flow adjusting unit 20 is a 3-way valve. The 3-way valve can be actuated to easily open or shut first, second, and third lines 41, 42, 43 by supplying, for example, nitrogen gas under a pressure of 60 to 70 psi (lb/in$^2$; 0.07031 kg/cm$^2$). In this regard, when the chemical is supplied from chemical tank 10 to dispensing unit 30, the 3-way valve shuts second line 42 and opens first and third lines 41, 43 so that the chemical passes through therein. On the other hand, when the chemical is supplied from chemical liquid dispensing unit 30 to semiconductor substrate 50, the 3-way valve shuts first line 41 and opens third and second lines 43, 42, thereby allowing the chemical to pass through therein.

The chemical used in a semiconductor device fabrication process may be a highly viscous chemical having a viscosity of 500 cP (centi Poise; centi g/cm sec) or more. If such a highly viscous chemical passes through a filter, as described in the Related Art section, gas bubbles contained in the chemical cannot readily be removed. In the present invention, a filter is preferably not installed in the system, which leads to a reduction in dispensing time during a semiconductor device fabrication process.

The highly viscous chemical may be a photoresist used in the formation of an etching mask to selectively etch semiconductor substrate 50, or an ion implantation mask to selectively implant ions onto semiconductor substrate 50.

The highly viscous chemical may be photosensitive polyimide. The photosensitive polyimide is used in the formation of an etching mask to selectively etch semiconductor substrate 50, or an ion implantation mask to selectively implant ions onto semiconductor substrate 50. However, unlike the photoresist, the photosensitive polyimide is not removed from semiconductor substrate 50, but left on as a final protective film.

The highly viscous chemical may be a non-photosensitive polyimide. The non-photosensitive polyimide is used when a photoresist or a photosensitive polyimide alone is insufficient to form a mask. In this case, the non-photosensitive polyimide is formed as the lower mask and the photoresist or the photosensitive polyimide is formed as the upper mask.

The system of the present invention further includes a vent line 60 connected between chemical liquid dispensing unit 30 and a 2-way valve 70. Two-way valve 70 opens or shuts vent line 60; therefore, if chemical stored in cylinder 31 contains gas bubbles, 2-way valve 70 is adapted to open vent line 60 to release the gas bubbles efficiently through vent line 60.

A method for dispensing a chemical according to an embodiment of the present invention will now be described with reference to FIGS. 1 and 2.

Referring to FIGS. 1 and 2, the method according to the present invention includes storing chemical in a dispensing unit prior to the chemical being dispensed (step S10), dispensing the chemical (step S20), and refilling the chemical (step S30).

In step S10, the chemical is stored and prepared in a chemical dispensing unit 30.

In step S20, the chemical is supplied onto a semiconductor substrate 50 through third and second lines 43, 42. A 3-way valve is adapted to shut first line 41 and open both third and second lines 43, 42.

In step S30, the chemical is supplied from a tank 10 to dispensing unit 30 through first and third lines 41, 43. At this time, the 3-way valve is adapted to shut second line 42 and to open both first and third lines 41, 43.

When multiple semiconductor substrates are fabricated, steps S10, S20, and S30 are sequentially repeated.

Preferably, in step 30, the same volume amount of chemical is refilled into dispensing unit 30 as the amount of chemical supplied onto semiconductor substrate 50 in step S20. By doing so, a consistent amount of the chemical is supplied onto semiconductor substrate 50.

It will be understood by those skilled in the art that changes may be made to these elements without departing from the scope of the invention which is defined by the attached claims.

What is claimed is:

1. A system for supplying a chemical, comprising:
   a tank for storing the chemical;
   a dispensing unit having a port through which the chemical flows into and out of the dispensing unit, and a pump operable to pump the chemical into and out of the dispensing unit via the port;
   a common line extending from the port of the dispensing unit and thereby connected to the dispensing unit;
   a first line extending from the tank and connected to the common line, wherein the common line and the first line together constitute a refill line that connects the tank to the dispensing unit, and the pump is operable to pump chemical from the tank into the dispensing unit via the port and the refill line; and
   a second line having a dispensing end from which the chemical is dispensed from the system, the dispensing line connected to the common line, wherein the common line and the second line together constitute a dispensing line that connects the dispensing end of the second line to the dispensing unit, and the pump is operable to pump the chemical out of the dispensing unit via the port and along the dispensing line to the dispensing end of the second line.

2. The system of claim 1, further comprising a directional flow control valve at which the first line, the second line and the common line terminate and to which the first line, the second line and the common line are connected, whereby the directional flow control valve is disposed in both the refill line and the dispensing line, and wherein the directional flow control valve is movable between one position at which the refill line is open between the tank and the dispensing unit whereas the dispensing line is closed by the valve, and another position at which the dispensing line is open whereas the refill line is closed between the tank and the dispensing unit by the valve.

3. The system of claim 1, further comprising a vent line connected to the dispensing unit.

4. The system of claim 1, wherein the dispensing unit comprises a cylinder, and the port extends through the cylinder.

5. A system for supplying a chemical to a semiconductor substrate during a semiconductor device fabrication process, comprising:
 a tank storing the chemical;
 a dispensing unit having a cylinder in which a certain volume of the chemical can be held, a port in the cylinder and through which the chemical flows into and out of the cylinder, and a pump comprising a member that is reciprocatable to
 pump the chemical into and out of the cylinder via the port;
 a common line extending from the port in the cylinder of the dispensing unit and thereby connected to the dispensing unit;
 a first line extending from the tank and connected to the common line, wherein the common line and the first line together constitute a refill line that connects the tank to the cylinder of the dispensing unit and the pump is operable to pump chemical from the tank into the cylinder of the dispensing unit via the port in the cylinder and the refill line; and
 a second line having a dispensing end from which the chemical is dispensed from the system, the dispensing line connected to the common line, wherein the common line and the second line together constitute a dispensing line that connects the dispensing end of the second line to the cylinder of the dispensing unit, and the pump is operable to pump the chemical out of the dispensing unit via the port in the cylinder and along the dispensing line to a the dispensing end of the second line.

6. The system of claim 5, further comprising a three-way directional flow control valve, the first line, the second line, and the common line all terminating at and connected to the three-way directional flow control valve.

7. The system of claim 5, wherein the chemical has a high viscosity of more than about 500 cP.

8. The system of claim 7, wherein the chemical is a photoresist, a non-photosensitive polyimide, or a photosensitive polyimide.

9. The system of claim 5, further comprising a vent line connected to the cylinder of the dispensing unit.

10. The system of claim 5, wherein the reciprocatable member of the pump is a piston disposed in the cylinder.

\* \* \* \* \*